(12) United States Patent
Kremer et al.

(10) Patent No.: US 9,400,018 B2
(45) Date of Patent: Jul. 26, 2016

(54) FLUTTER REDUCING WET CLUTCH FRICTION PLATE

(71) Applicant: GM Global Technology Operations LLC, Detroit, MI (US)

(72) Inventors: John M. Kremer, Sterling Heights, MI (US); Larry D. Diemer, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/550,356

(22) Filed: Nov. 21, 2014

(65) Prior Publication Data

US 2016/0146266 A1    May 26, 2016

(51) Int. Cl.
*F16D 13/64* (2006.01)
*F16D 13/38* (2006.01)
*F16D 25/0638* (2006.01)

(52) U.S. Cl.
CPC .............. *F16D 13/648* (2013.01); *F16D 13/38* (2013.01); *F16D 13/64* (2013.01); *F16D 25/0638* (2013.01)

(58) Field of Classification Search
None
See application file for complete search history.

(56) References Cited

U.S. PATENT DOCUMENTS

| | | | | |
|---|---|---|---|---|
| 3,198,295 | A | * | 8/1965 | Fangman .............. F16D 13/648 188/152 |
| 2010/0072020 | A1 | * | 3/2010 | Cimatti ................. F16D 13/52 192/113.35 |
| 2012/0261228 | A1 | * | 10/2012 | Chen ....................... F16D 48/06 192/82 T |

* cited by examiner

*Primary Examiner* — Richard Lorence

(57) ABSTRACT

The present invention provides improved clutch plates for use in wet friction pack clutches and brakes which exhibit greatly reduced flutter particularly at high rotational speeds. Friction clutches and brakes include a first plurality of circular clutch plates or discs coupled to a first member comprising a metal core plate having bands of friction material affixed to both faces. These clutch plates are interleaved with a second plurality of circular metal reaction plates which are coupled to a second member. The metal core plate of the first plurality of clutch plates includes a plurality of radial slots spaced about the core plate which extend inwardly a portion of the radial width of the clutch core plate. Different numbers of slots, different spacings and different configurations of slots provide reduced plate flutter with varying thicknesses of core plates and ranges of rotational speeds.

19 Claims, 3 Drawing Sheets

FLUTTER REDUCING WET CLUTCH FRICTION PLATE

FIELD

The present disclosure relates to improvements in wet clutch friction plates and more particularly to wet clutch friction plates having radial slots or grooves about their edges that reduce standing vibration waves.

BACKGROUND

The statements in this section merely provide background information related to the present disclosure and may or may not constitute prior art.

Friction clutch packs, that is, clutches and brakes having first and second interleaved pluralities of clutch plates compressed axially by an actuator to effect torque transfer are extraordinarily common components in modern automatic motor vehicle transmissions utilizing a plurality of planetary gear assemblies. Numerous features such as compact size, high torque transfer capability, modulating or proportioning capability and flexibility of configuration account for this popularity.

Such friction clutch packs, especially friction brakes wherein one of the pluralities of clutch plates is stationary, are not without certain disadvantages. One of the most significant disadvantage results from the basic construction of the clutch: the pluralities of interleaved clutch plates. When a first plurality is stationary or rotating at a relatively slow speed and the second plurality is rotating at a relatively high speed, the resulting frictional losses, referred to as spin losses, caused by multiple surfaces rotating against one another with only negligible axial spacing between them, can be significant, and especially so at higher speeds.

Another disadvantage related to both the small inter plate spacing and high rotational speeds of friction clutches or brakes is plate flutter. The first mode of structural vibration of a disc or plate is bending about one of the discs axes. Flat discs or plates provide no means to impede this first mode of vibration. Clutch plate flutter is the tendency of clutch plates to develop standing waves as they rotate, again particularly at high rotational speeds which may readily be in the range of from 8,000 to 12,000 r.p.m. The standing waves may distort the edge of the clutch plate so that it has a sinusoidal periphery and the wave may travel with or against the direction of rotation of the clutch plate.

It has been determined that such standing waves, which may develop in one or several clutch plates, exacerbate the spin loss problem. This occurs because the crowns or raised regions of the distorted plates are concentrated areas of frictional contact with adjacent plates and these concentrated areas of heat generation form hot spots on the surfaces of the plates which can cause thermal degradation of the friction material.

From the foregoing, it is apparent that reducing or eliminating the generation of bending and plate flutter in the plates of friction pack clutches and brakes rotating at high speeds would be beneficial and the present invention is so directed.

SUMMARY

The present invention provides improved clutch plates for use in friction pack clutches and brakes which exhibit greatly reduced flutter particularly at high rotational speeds. Generally speaking, friction clutches and brakes include a first plurality of circular clutch plates or discs coupled to a first member comprising a metal core plate having bands of friction material affixed to both faces. These clutch plates or discs are interleaved with a second plurality of circular metal reaction plates which are coupled to a second member. Again, generally speaking, the first plurality of clutch plates includes inner or female splines which rotationally couple them to a hub and the second plurality of clutch plates includes outer or male splines which rotationally couple them to a housing. If the device is a clutch, both members are capable of rotation whereas if the device is a brake, one of the two members and the associated plates are stationary. The metal core plate of the first plurality of clutch plates includes a plurality of radial slots spaced about either the outer or the inner edge of the plate. The plurality of radial slots extend inwardly a portion of the radial width of the clutch plate. Different numbers of slots, different circumferential spacings and different configurations of slots provide reduced core plate flutter with varying thicknesses of plates and ranges of rotational speeds.

Thus it is an aspect of the present invention to provide a clutch plate for a friction pack clutch or brake having reduced flutter.

It is a further aspect of the present invention to provide a clutch plate for a friction pack clutch or brake having reduced flutter and thus reduced spin loss.

It is a still further aspect of the present invention to provide a clutch plate for a wet friction pack clutch or brake having reduced flutter and thus reduced spin loss.

It is a still further aspect of the present invention to provide a clutch plate for a friction pack clutch or brake having radial slots formed in its outer or inner edge.

It is a still further aspect of the present invention to provide a clutch plate having a core plate for a friction pack clutch or brake having radial slots formed in its outer or inner edge.

It is a still further aspect of the present invention to provide a clutch plate having a core plate and friction material secured thereto for a friction pack clutch or brake having radial slots formed in its outer or inner edge.

It is a still further aspect of the present invention to provide a clutch plate having a core plate and friction material secured thereto for a friction pack clutch or brake having a plurality of circumferentially spaced radial slots formed in its outer or inner edge.

It is a still further aspect of the present invention to provide a clutch plate having a core plate and friction material secured thereto for a friction pack clutch or brake having a plurality of equally circumferentially spaced radial slots formed in its outer or inner edge.

It is a still further aspect of the present invention to provide a clutch plate having a core plate and friction material secured thereto for a friction pack clutch or brake having a plurality of circumferentially spaced radial slots formed in its outer or inner edge which extend inwardly a portion of the width of the clutch plate.

It is a still further aspect of the present invention to provide a clutch plate having a metal core plate and friction material secured thereto for a friction pack clutch or brake having a plurality of circumferentially spaced radial slots formed in its outer or inner edge which extend inwardly a portion of the width of the clutch plate.

It is a still further aspect of the present invention to provide a clutch plate having a metal core plate and friction material secured thereto for a friction pack clutch or brake having a plurality of equally circumferentially spaced radial slots formed in its outer or inner edge which extend inwardly a portion of the width of the clutch plate.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
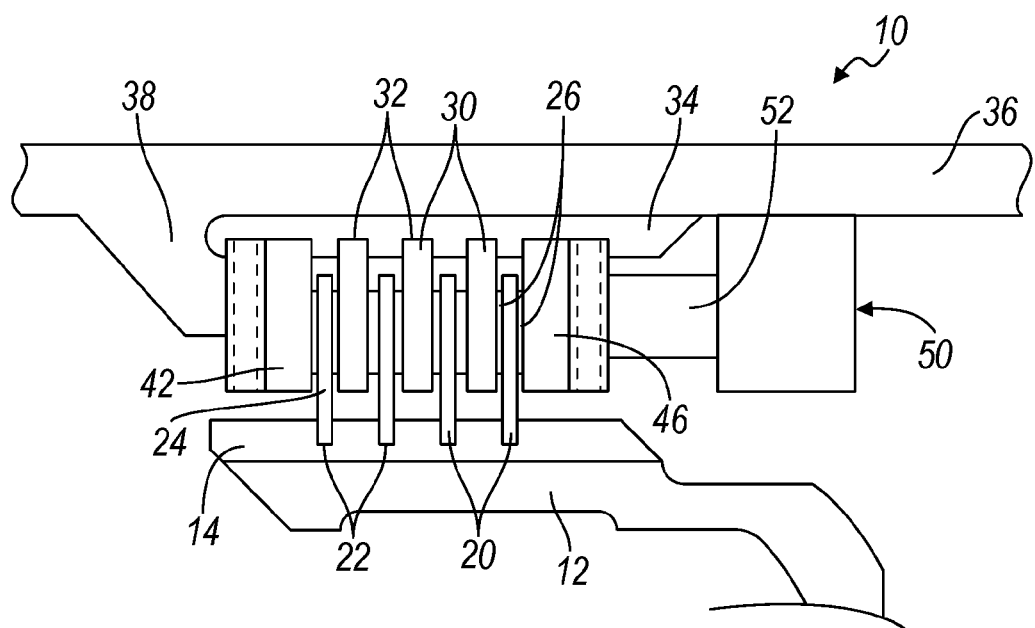
FIG. 1 is a half sectional view of a wet friction pack clutch or brake assembly incorporating the present invention.
Figure 2:
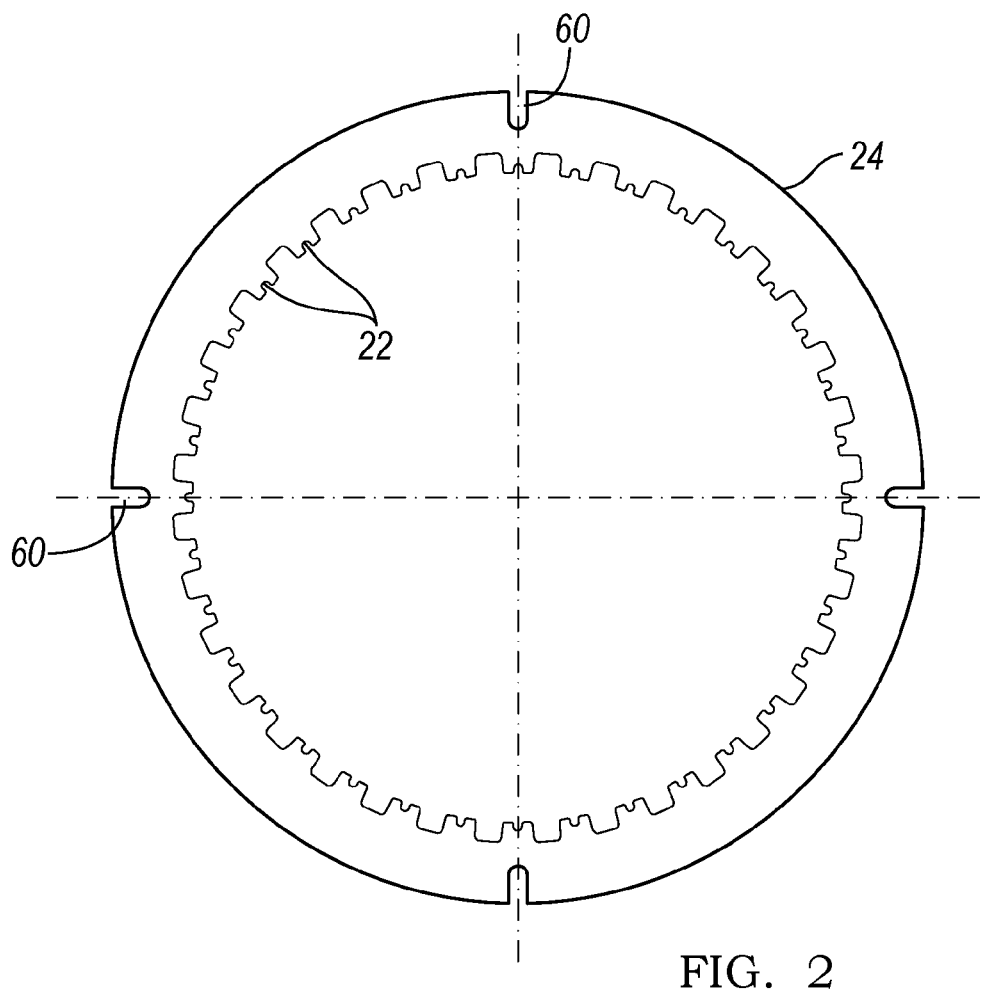
FIG. 2 is a plan view of a first embodiment of a wet friction clutch core plate according to the present invention having a plurality of slots which extend into the core plate from its outer edge.

With reference to FIGS. 1 and 2, a typical and conventional wet friction clutch pack assembly is illustrated and generally designated by the reference number 10. The wet friction clutch pack assembly 10 includes a cylindrical inner or input hub or first drive member 12 having male or external splines 14 disposed about its periphery. The male splines 14 engage and drive complementary female or internal splines 22 disposed about the interior of a plurality of first clutch plates or discs 20. The plurality of first clutch plates or discs 20 each include a metal core plate 24 in which the splines 22 are formed and a band or annulus of friction material 26 affixed or secured to each face of the clutch plate or disc 20. Preferably the metal core plate 24 is carbon steel, a low carbon steel or a similar material.

The plurality of first clutch plates or discs 20 are interleaved with a plurality of second reaction plates or discs 30. The plurality of second reaction plates or discs 30 are generally somewhat thicker than the plurality of first clutch plates or discs 20 and are also fabricated of carbon steel, a low carbon steel or a similar material. The plurality of second reaction plates or discs 30 includes male or external splines 32 about their peripheries which are complementary to and engage female or internal splines 34 on the inner surface of an output member, cylindrical shell or housing 36. If the housing 36 is stationary, it may be a portion of, for example, a vehicle transmission or a vehicle transmission housing (not illustrated) in which case the friction clutch pack assembly 10 is conventionally designated a brake. Contrariwise, if the housing 36 rotates and is coupled to other rotating members or components (not illustrated) the friction clutch pack assembly 10 is conventionally designated a clutch. It will be appreciated that the present invention is applicable to both clutches and brakes and thus that the present disclosure and invention subsumes both such devices, applications and uses.

The housing 36 includes a preferably circular flange or projection 38 against which a circular backing or stop plate 42 abuts. The circular flange or projection 38 and the stop plate 42 are disposed at one end of the interleaved pluralities of plates or discs 20 and 30. At the opposite end of the interleaved plates or discs 20 and 30 is a circular apply plate 46 and on the opposite side of the apply plate 46 from the interleaved plates or discs 20 and 30 is a piston 52 of a hydraulic actuator 50.

In conventional fashion, the application of pressurized hydraulic fluid to the hydraulic actuator 50 translates the piston 52 toward the apply plate 46 and compresses the interleaved plates or discs 20 and 30, creating a torque path between the input hub 12 and the output member 36. It will be appreciated that the designations input and output are utilized merely by way of explanation and example and that the input 12 may, in fact, be the output in certain applications and the output member 36 may be the input.

Referring now to FIG. 1 and particularly to FIG. 2, the metal core plate 24 of one of the plurality of first clutch plates or discs 20 is illustrated. The metal core plate 24 includes four radially oriented narrow slots 60 disposed at equal 90° intervals about the periphery of the metal core plate 24. Each of the slots 60 extends into the metal core plate 24 less than one half the radial width or thickness of the metal core plate 24. The four slots 60 provide four sites for the attenuation of axial displacements that cause flutter in the metal core plate 24 of the clutch plates 20.

Figure 3:
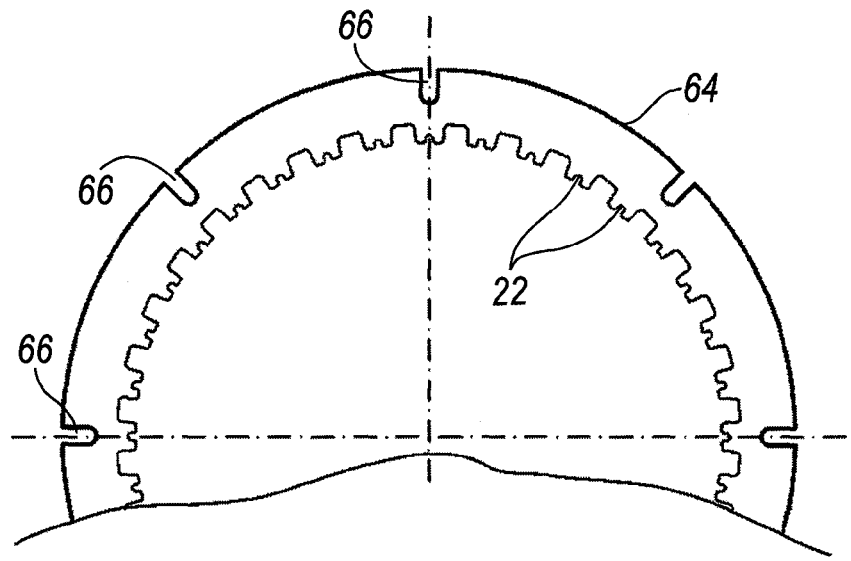
FIG. 3 is a fragmentary plan view of a second embodiment of a wet friction clutch core plate incorporating the present invention.
Figure 7:
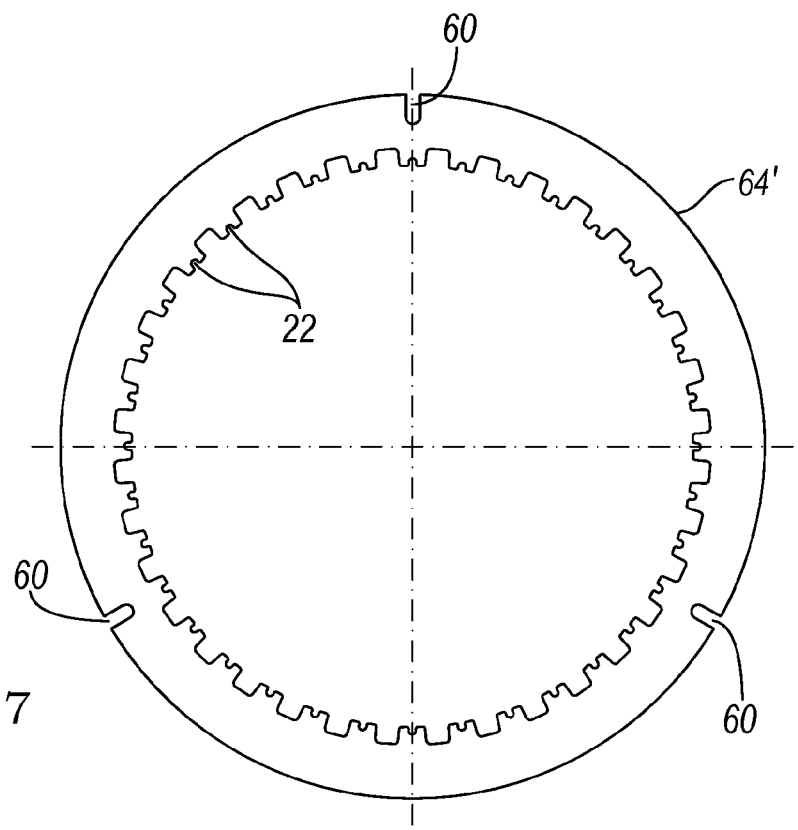
FIG. 7 is a plan view of a sixth embodiment of a wet friction clutch core plate according to the present invention having an odd number of slots which extend into the core plate from its outer edge.

Referring now to FIGS. 3 and 7, a second and a sixth embodiment of a metal core plate 64 are illustrated. The metal core plate 64 is in all respects the same as the metal core plate 24 and, when utilized in a typical wet friction clutch pack such as the assembly 10, includes bands of friction material 26 (illustrated in FIG. 1) secured thereto except that it includes additional slots. The metal core plate 64 includes eight radially oriented narrow slots 66 disposed at equal 45° intervals about the periphery of the metal core plate 24. The larger number of slots 66 provides additional sites for the attenuation of axial displacements that cause flutter in the metal core plate 64 of the clutch plates 20. It should be appreciated that the number of slots 60 in the metal core plate 24 and the number of slots 66 in the metal core plate 64 may be adjusted up or down, the primary consideration being the outside diameter of the metal core plates 24 and 64. Thus, larger diameter metal core plates 24 and 64 may have six, ten, twelve or more slots 66 whereas smaller diameter metal core plates 24 and 64 may have, for example, three, four, five or six slots 60. FIG. 7 illustrates a metal core plate 64' similar in all respects to the metal core plate 64 illustrated in FIG. 3 except that it includes an odd number of slots 66, namely three slots 66, although it could readily include a larger, odd number of slots 66 such as five, seven, nine or more.

Figure 4:
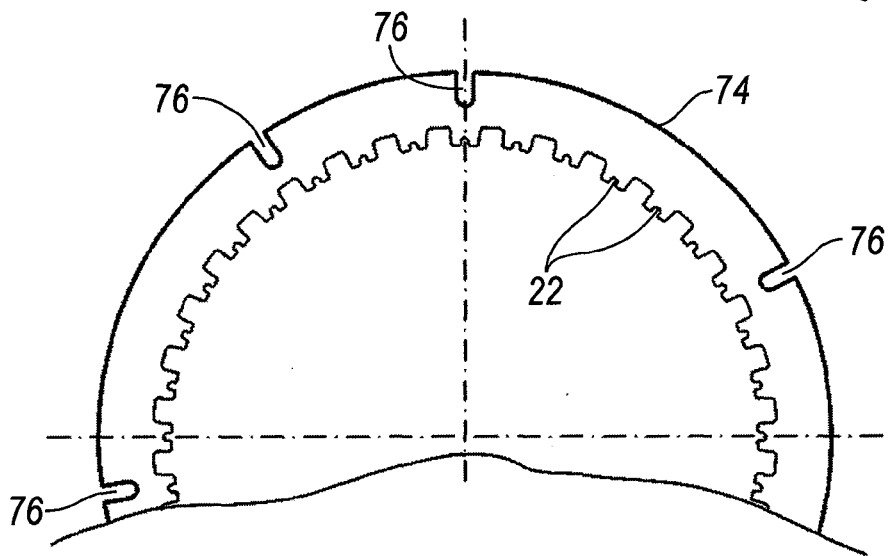
FIG. 4 is a fragmentary plan view of a third embodiment of a wet friction clutch core plate incorporating the present invention.

Referring now to FIG. 4, a third embodiment of a metal core plate 74 is illustrated. The metal core plate 74 is in all respects the same as the metal core plate 24 and, when utilized in a typical wet friction clutch pack such as the assembly 10, includes bands of friction material 26 (illustrated in FIG. 1) secured thereto except that it includes a plurality of randomly disposed slots. The metal core plate 74 includes at least four and typically five, six, seven, eight, nine or ten radially oriented narrow slots 76 disposed at random, i.e., unequally circumferentially spaced intervals about the periphery of the metal core plate 74.

The random circumferential locations of the slots 76 provide sites for the attenuation of axial displacements across a relatively wide range of rotational speeds and resonant frequencies that cause flutter in the metal core plate 74 of the clutch plates 20.

Figure 5:
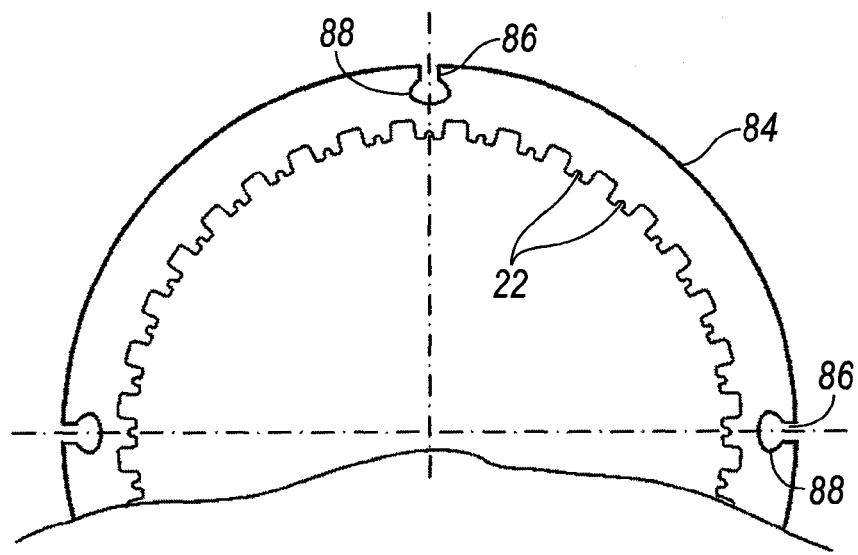
FIG. 5 is a fragmentary plan view of a fourth embodiment of a wet friction clutch core plate incorporating the present invention.

Referring now to FIG. 5, a fourth embodiment of a metal core plate 84 is illustrated. The metal core plate 84 is in all respects the same as the metal core plate 24 and, when utilized in a typical wet friction clutch pack such as the assembly 10, includes bands of friction material 26 (illustrated in FIG. 1) secured thereto except that it includes a plurality of radially inwardly extending slots 86 terminating in an enlarged opening or foot portion 88. The opening 88 may be circular, as illustrated, or any other shape such as, for example, oval. The metal core plate 84 includes at least four and typically five, six, eight, ten or more equally circumferentially or randomly circumferentially spaced slots 86 and the openings 88 disposed about the periphery of the metal core plate 84. The enlarged openings 88 function as hinge or pivot points about which the peripheral regions of the metal core plate 84 move thereby attenuating axial displacements that would otherwise cause flutter in the metal core plate 84 of the clutch plates 20.

Figure 6:
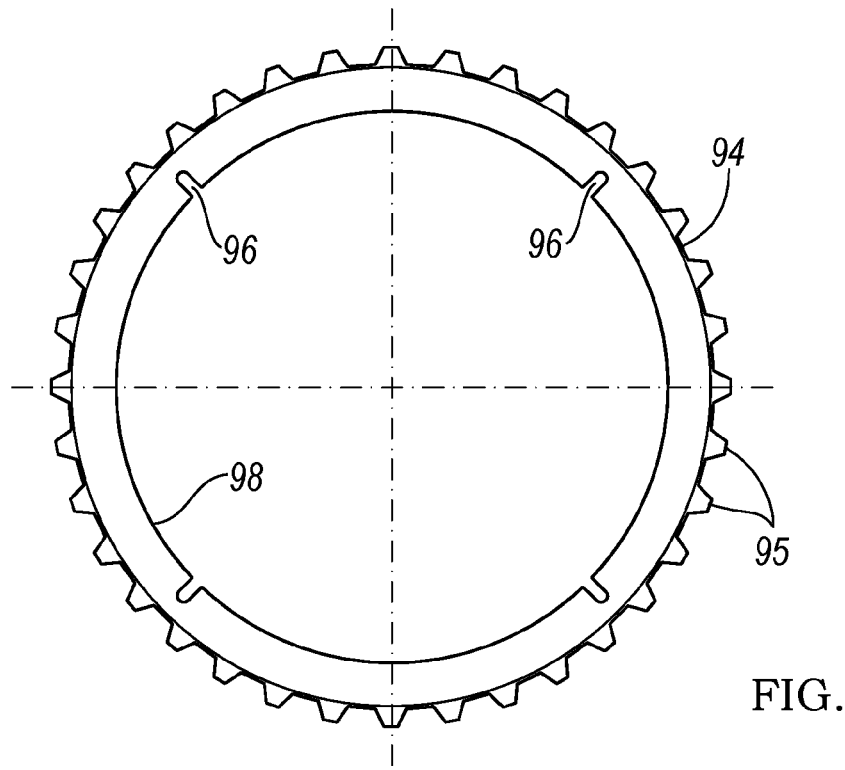
FIG. 6 is a plan view of a fifth embodiment of a wet friction clutch core plate according to the present invention having a plurality of slots which extend into the core plate from its inner edge.

Referring now to FIG. 6, a fifth embodiment of a metal core plate 94 is illustrated. The metal core plate 94 is similar in most respects to the metal core plate 24 and, when utilized in a typical wet friction clutch pack such as the assembly 10, includes bands of friction material 26 (illustrated in FIG. 1) secured thereto except that it includes splines or teeth 95 about its outer edge and a plurality of radially outwardly extending slots 96 that extend into the metal core plate 94 from its inner edge 98 less than half its radial width. The metal core plate 94 includes at least three and typically four, five, six, seven, eight, nine, ten or twelve radially oriented slots 96 which may be equally circumferentially spaced, as in the first and second embodiments, randomly circumferentially spaced, as in the third embodiment, or include enlarged terminal (foot) openings, as in the fourth embodiment. As explained above, the primary determinant of the number of slots 96 is the diameter of the metal core plate 94, with smaller diameter plates 94 generally having fewer slots 96 and vice versa.

The description of the invention is merely exemplary in nature and variations that do not depart from the gist of the invention are intended to be within the scope of the invention and the following claims. Such variations are not to be regarded as a departure from the spirit and scope of the invention.

What is claimed is:

1. A component for a wet friction clutch pack assembly comprising, in combination,
    a circular core plate fabricated of metal and having first and second opposed faces, an outer edge and an inner edge,
    a band of continuous friction material affixed to said first and second faces of said circular core plate,
    a plurality of slots extending into said core plate from one of said edges less than half a radial width of said core plate, and
    a plurality of splines extending from said core plate on another of said edges.

2. The component for a wet friction clutch pack assembly of claim 1 wherein said plurality of slots are radial and define an even number.

3. The component for a wet friction clutch pack assembly of claim 1 wherein said plurality of slots are radial and define an odd number.

4. The component for a wet friction clutch pack assembly of claim 1 wherein said plurality of slots are disposed radially and in equal intervals about said core plate.

5. The component for a wet friction clutch pack assembly of claim 1 wherein said plurality of slots are disposed radially and randomly about said core plate.

6. The component for a wet friction clutch pack assembly of claim 1 wherein said plurality of slots are radial and terminate in a circular opening.

7. The component for a wet friction clutch pack assembly of claim 1 wherein said circular core plate is fabricated of a low carbon steel and wherein said friction material defines an annulus.

8. A friction clutch pack assembly comprising, in combination,
    a first member having external splines,
    a first plurality of clutch core plates each having inner and outer edges, a first face and a second face, internal splines engaged by said external splines of said first member, an annulus of continuous friction material secured to said first and said second faces and a plurality of slots extending into said core plate from one of its edges less than half a radial width of said core plate,
    a second plurality of reaction plates interleaved with said first plurality of clutch core plates and having external splines,
    a second member disposed about said second plurality of reaction plates and having internal splines engaging said external splines on said second plurality of reaction plates, and
    an actuator for compressing said interleaved pluralities of clutch core plates and reaction plates and creating a torque path between said first member and said second member.

9. The friction clutch pack assembly of claim 8 wherein said first member is a cylindrical hub and said second member is a cylindrical housing.

10. The friction clutch pack assembly of claim 8 wherein said friction clutch pack assembly is a wet friction clutch pack assembly.

11. The friction clutch pack assembly of claim 8 wherein said plurality of slots in said first plurality of clutch core plates are radial and define an even number.

12. The friction clutch pack assembly of claim 8 wherein said pluralilty of slots in said first plurality of clutch core plates are radial and define an odd number.

13. The friction clutch pack assembly of claim 8 wherein said plurality of slots in said first plurality of clutch core plates are disposed radially at equal intervals about said core plate.

14. The friction clutch pack assembly of claim 8 wherein said plurality of slots in said first plurality of clutch core plates are disposed radially at random intervals about said core plate.

15. The friction clutch pack assembly of claim 8 wherein said plurality of slots in said first plurality of clutch core plates are radially oriented and terminate in a circular opening.

16. A component for a friction clutch or brake assembly comprising, in combination,
    a circular core plate fabricated of metal and having first and second opposed faces, an outer edge and an inner edge,
    a continuous annulus of friction material affixed to each of said first and said second faces of said circular core plate,
    a plurality of splines extending outwardly from one of said edges of said core plate, and a plurality of radial slots extending inwardly from another of said edges of said core plate less than half a radial width of said core plate.

17. The component for a friction clutch or brake assembly of claim 16 wherein said plurality of radial slots are disposed in equal intervals about said core plate.

18. The component for a friction clutch or brake assembly of claim 16 wherein said plurality of radial slots are disposed at random intervals about said core plate.

19. The component for a friction clutch or brake assembly of claim 16 wherein said plurality of radial slots terminate in a circular opening.

* * * * *